United States Patent [19]
Beck et al.

[11] Patent Number: 5,545,013
[45] Date of Patent: Aug. 13, 1996

[54] HYDROSTATIC MACHINE WITH LEAKAGE OIL DISCHARGE

[75] Inventors: Jochen Beck, D-Ulm; Werner Hormann, Illertissen, both of Germany

[73] Assignee: Brueninghaus Hydromatik GmbH, Elchingen, Germany

[21] Appl. No.: 335,818

[22] Filed: Jan. 25, 1995

[30] Foreign Application Priority Data

May 14, 1992 [DE] Germany ............... 42 15 869.9

[51] Int. Cl.⁶ .................................. F04B 23/04
[52] U.S. Cl. ........................... 417/201; 417/269
[58] Field of Search ................... 417/199.1, 201, 417/269; 184/6.13, 6.16, 31

[56] References Cited

U.S. PATENT DOCUMENTS

| | | |
|---|---|---|
| 2,457,101 | 12/1948 | Horton . |
| 2,570,698 | 10/1951 | Manseau ............................. 417/269 |
| 4,350,011 | 9/1982 | Rögner et al. ........................ 184/31 |

FOREIGN PATENT DOCUMENTS

| | | |
|---|---|---|
| 188713 | 12/1985 | European Pat. Off. . |
| 1114131 | 4/1956 | France . |
| 2145741 | 10/1972 | France . |
| 7428202 | 3/1975 | France . |
| 3638890 | 2/1988 | Germany . |
| 588614 | 5/1947 | United Kingdom . |
| 656949 | 9/1951 | United Kingdom . |

*Primary Examiner*—Charles Freay
*Attorney, Agent, or Firm*—Scully, Scott, Murphy & Presser

[57] ABSTRACT

The invention relates to a hydrostatic machine, in particular axial piston machine, having a machine housing the internal housing chamber of which accommodates a drive mechanism rotatably mounted by means of at least one bearing and has a leakage oil chamber opening to the outside via at least one leakage oil connection. To avoid splash losses of the hydrostatic machine, in accordance with the invention a pump device (29; 50; 60; 70) is arranged in the internal housing chamber in driving connection with the drive mechanism (3, 4, 7), which device is provided to pump leakage oil out of the leakage oil chamber (28) through the leakage oil connection (8, 37; 72) to the outside.

23 Claims, 5 Drawing Sheets

HYDROSTATIC MACHINE WITH LEAKAGE OIL DISCHARGE

BACKGROUND OF THE INVENTION

The invention relates to a hydrostatic machine, in particular axial piston machine, having a machine housing the internal housing chamber of which accommodates a drive mechanism rotatably mounted by means of at least one bearing and has a leakage oil chamber opening to the outside via at least one leakage oil connection.

There is known from DE 36 38 890 C2 such a hydrostatic machine in which the leakage oil chamber is permanently filled with leakage oil, which includes not only the normal leakage oil component unavoidably arising as a result of the internal leakage occurring in operation, but also a flushing oil component issued from the low pressure side via a flushing valve for the purpose of flushing, and is discharged to the tank via a leakage oil line connected with the leakage oil connection. Primarily because of the flow resistances in this leakage oil line, the leakage oil on the leakage oil chamber is subject to over-pressure, so that the drive mechanism rotating therein gives rise to correspondingly high splash losses.

SUMMARY OF THE INVENTION

It is the object of the invention to further develop a hydrostatic machine of the kind mentioned in the introduction so that splash losses are largely avoided.

This object is achieved in accordance with the invention by means of pump device arranged in the internal housing chamber and in driving connection with the drive mechanism, which device is provided to pump off leakage oil from the leakage oil chamber through the leakage oil connection to the outside.

Although there is known from the previously laid-open (but not published in printed form) DE 41 28 615 C1 a pump device for discharging leakage oil from the leakage oil chamber of a hydraulic motor, this pump is however arranged outside the hydraulic motor in the leakage oil line leading from its leakage oil connection to the tank, and is formed as a jet pump or positive displacement pump. This known pump device has, in contrast to the pump in accordance with the invention, which is preferably formed as a friction pump, a greater constructional outlay and requires additional installation work upon installation of the hydrostatic machine, its own drive and, in the case of a positive displacement pump, a control device for switching the pump on when the splash losses caused by the leakage oil in the leakage oil chamber reach an unacceptable level.

Expediently, the pump device is a centrifugal pump and comprises an impeller with radially developing or curved vanes which are arranged fixed on the outer circumference of the drive mechanism and/or on a free end face of the mechanism.

In accordance with a further development of the invention, the pump device is arranged eccentrically of the machine housing, forming an annular chamber which in radial section is sickle shaped, whereby the leakage oil connection opens in the annular chamber region of greater radial dimension. The kinetic energy of the leakage oil sucked in from the leakage oil chamber and accelerated in the pump device is transformed into pressure in the annular chamber region of greater radial dimension, working as a diffuser, thereby to overcome flow resistances in a leakage oil line connected to the leakage oil connection. Additionally or alternatively to this sickle shaped annular chamber, a guide vane arrangement can be associated with the pump device, which likewise transforms into pressure the kinetic energy of the leakage oil flow in the pump device.

The pump device in the form of a friction pump has a very small constructional outlay and at the same time the advantage that when the leakage oil level in the housing is too low, i.e. when no leakage oil is sucked away, neither is air delivered. This pump device comprises preferably at least one pump surface rotating with the drive mechanism, the pump action of which is based on the carrying along of the frictional layer of leakage oil, adhering to the pump surface, to be pumped away. This pump surface can be a cylindrical pump surface formed on the drive mechanism, for example on its outer circumference, or a flat pump surface extending in a radial plane perpendicular to the drive mechanism, preferably on a free drive mechanism end face. In the case of the configuration of the hydrostatic machine as axial piston machine of bent axis construction, the flat pump surface is expediently formed on a free end face of a drive disk of the drive mechanism. Here, the leakage oil connection is preferably formed with axial spacing from the flat pump surface in the region covered by the drive disk.

In accordance with a further development of the invention, the friction pump comprises an annular groove formed in the drive mechanism, opening at a free end face of the mechanism, the radially outward groove wall of which groove provides the cylindrical pump surface and the groove floor of which provides the flat pump surface. Here, the leakage oil connection can be formed as a pipe piece having an open end directed oppositely to the direction of rotation of the drive mechanism and arranged with a substantially tangential development in the annular groove and connected to a line arrangement leading outside of the annular groove and the hydrostatic machine.

There can be provided an annular grove closure element, for example in the form of a closure plate, which restricts the opening of the annular groove to an annular entry slit, the surface of which closure element facing the internal space of the annular groove provides a further flat pump surface which preferably adjoins the cylindrical pump surface and can, like the other pump surfaces, be roughened or otherwise textured for the purpose of enhancing the delivery performance. Preferably, the pipe piece is arranged in the internal space region of the annular groove covered by the ring groove closure element.

In accordance with a further development of the invention, two substantially radially developing annular limiting means are arranged to both sides of the pump device, which means form, together with the section of the machine housing located therebetween, a pump housing having axial leakage oil inflow. One of the annular limiting means is expediently formed as an annular plate attached to the machine housing, which terminates at a predetermined spacing from the drive mechanism; through the annular gap corresponding to the predetermined spacing between the ring plate and the drive mechanism, leakage oil can flow axially into the pump device.

Preferably, in the installed condition of the hydrostatic machine, the leakage oil connection is arranged in the upper vertex region of the machine housing. The leakage oil flow to the pump device through the annular gap occurs in this case in the lower vertex region of the machine housing, whereby the level of a remaining leakage oil quantity left in the leakage oil chamber can be determined by appropriate selection of the radial dimension of the annular plate, the angle which the hydrostatic machine has relative to the vertical, and the feed performance of the pump device.

Further advantages and features of the invention are apparent from the remaining claims.

BRIEF DESCRIPTION OF THE DRAWINGS

Below, the invention is described in more detail with reference to a few preferred exemplary embodiments and with reference to the drawings, in which.

DESCRIPTION OF THE PREFERRED EMBODIMENT

Figure 1:
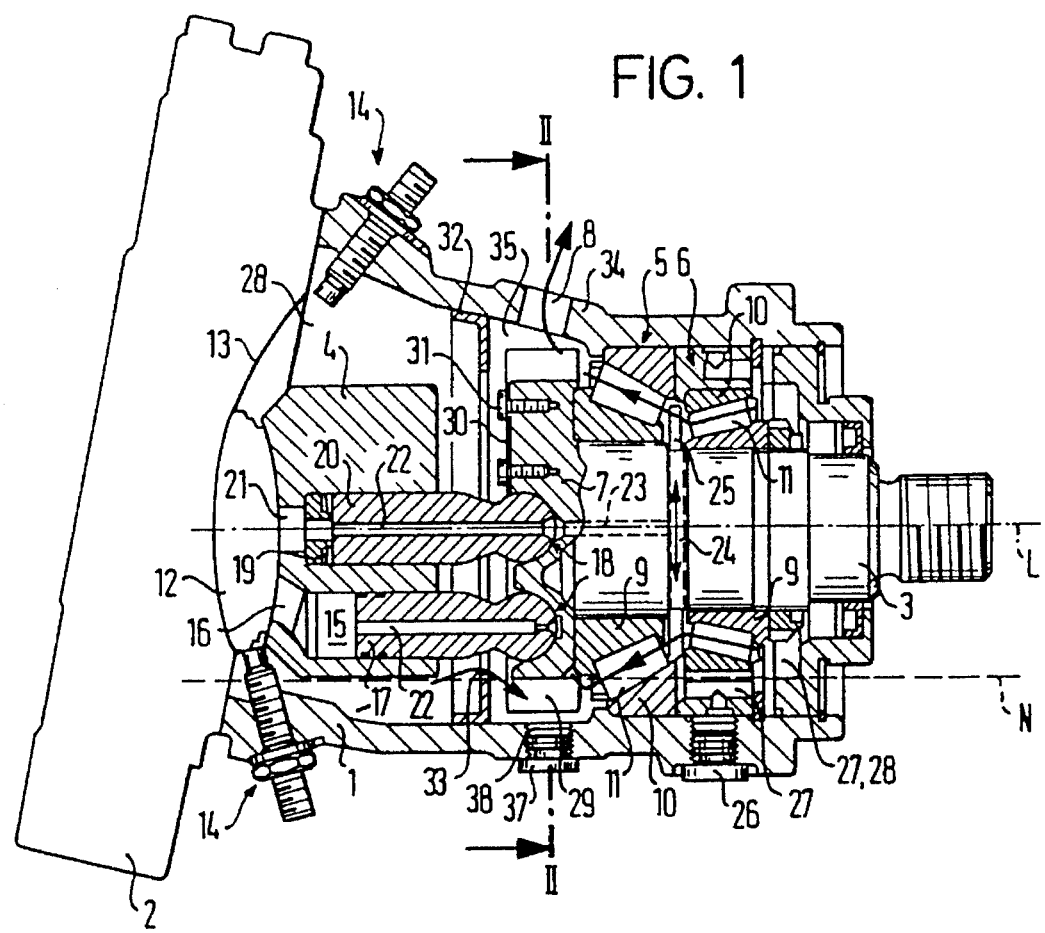
FIG. 1 shows schematically an axial section of the hydrostatic machine according to a first preferred embodiment of the invention.
Figure 4:
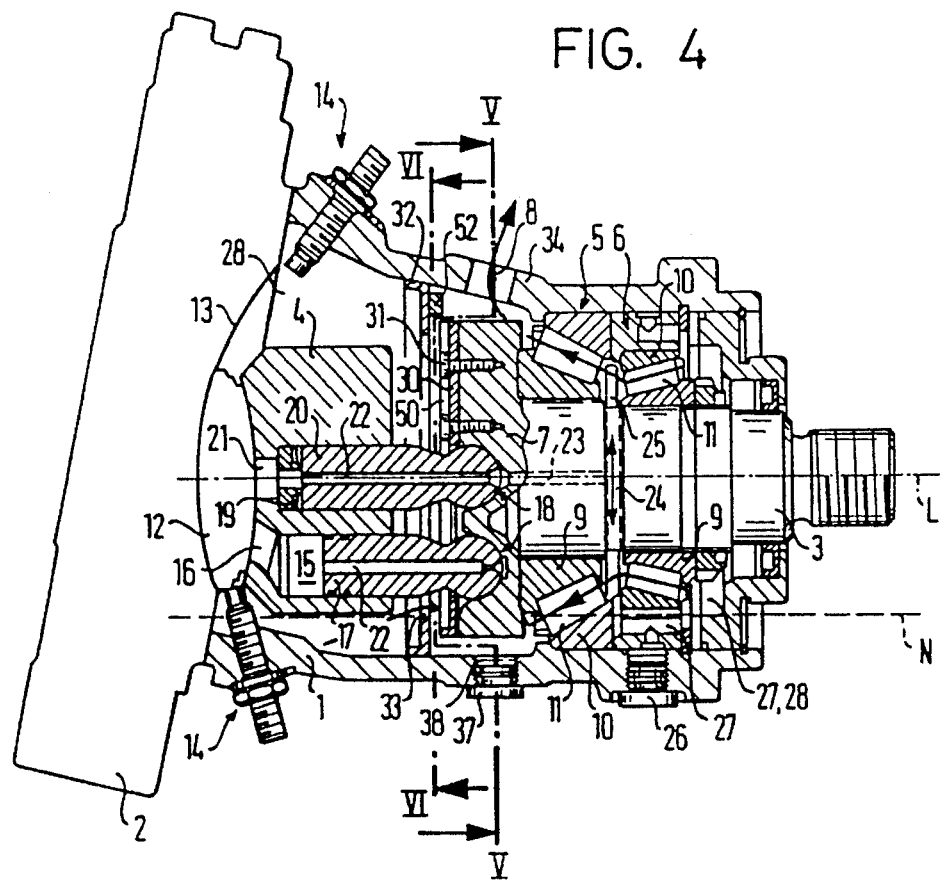
FIG. 4 shows schematically an axial section of the hydrostatic machine according to a second preferred exemplary embodiment of the invention.

The hydrostatic machine shown in FIGS. 1 and 4 is a generally conventional axial piston machine of bent axis construction. It is intended for horizontal installation and comprises a machine housing 1 and a rotatably arranged driving mechanism in its housing inner chamber, which driving mechanism is provided in accordance with the invention with a pump device 29 or 50.

Figure 2:
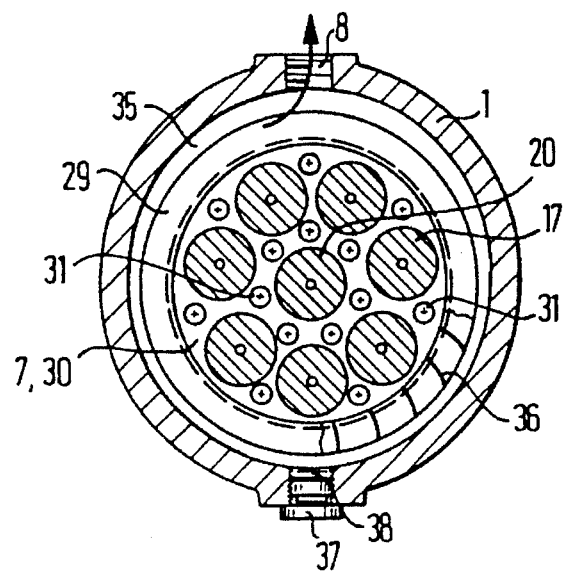
FIG. 2 shows a section along the line II—II of FIG. 1.

About half way along, the otherwise cylindrical machine housing 1 is expanded on one side such that the radius of the upper half of the housing cross-section—which radius runs vertically in FIG. 2—consistently increases towards an end closure plate 2, with constant radius of the lower half of the housing cross-section and with appropriate transitions between the two radii. In this way, the machine housing 1 comprises a cylindrical housing part and a housing part which is elliptical in cross-section.

The drive mechanism comprises a drive shaft 3 and a cylinder barrel 4. The drive shaft 3 is rotatably mounted in the cylindrical housing by means of two tapered roller bearings 5, 6 and ends in the initial region of the housing part of elliptical cross-section with a flange-like section, constituting a drive disk 7, of greater diameter, the plane of rotation of which cuts a leakage oil connection 8 in the machine housing 1, in the upper vertex of the housing in the drawing. A leaking oil line (not shown) leads from the leakage oil connection 8 to a tank (likewise not shown). The drive disk is arranged in the immediate vicinity of the tapered roller bearing 5. Each tapered roller bearing 5, 6 comprises a inner ring 9, attached to the drive shaft 3, an outer ring 10, attached to the machine housing 1, and tapered rollers 11 located between the rings.

The cylinder barrel 4 is rotatably mounted on a control body 12 in the part of the machine housing 1 of elliptical cross-section. This mounting is self-centering: to this end the bearing surfaces of the cylinder barrel 4 and of the control body 12, are formed—as shown in FIG. 1 for example—concavely and convexly spherically. The control body 12 is arranged displaceably in a circular path form support and swivel bearing 13 in the closure plate 2 and can be fixed within this bearing in any desired disposition by means of an adjustment device 14. In known manner, there are formed in the control body 12 two mutually opposing control kidneys (not shown), which are connected to a pressure connection and an exhaust connection (likewise not shown) of the axial piston machine.

In the cylinder barrel 4, cylinder chambers 15 running axially and distributed evenly over a part circle are formed, in known manner, which chambers open via cylinder channels 16 at the bearing surface of the cylinder barrel 4 supported on the control body 12 and upon rotation of the cylinder barrel connect the cylinder chambers 15 with the pressure and exhaust connections. Pistons 17 are arranged reciprocally movably in the cylinder chambers 15. Their piston rods are connected for rotation with the drive disk 7 via ball joints 18.

A compression spring 19 sits in a central blind bore in the cylinder barrel 4, which spring bears against a center pin 20 projecting into the blind bore and likewise connected with the drive disk 7 by way of a ball joint 18 and in this way holds the cylinder barrel 4 in abutment against the control body 12 when no oil pressure forces occur.

Via an oil channel 21 the blind bore opens at the bearing surface of the cylinder barrel 4. This oil channel 21 supplies both tapered roller bearings 5, 6 with pressurized oil from the internal oil circulation of the axial piston machine for the purpose of lubrication, via an axial through-bore 22 in the center pin 20, a continuing axial bore 23 in the drive shaft 3, a circumferential groove 24 formed in the same in a radial plane between the two tapered roller bearings 5, 6 and radial bores 25 in the same radial plane. The oil supply to the ball joints 18 is likewise effected from the internal oil circulation via the through bore 22 in the center pin 20 and via axial through bores, of essentially the same kind, likewise indicated by reference sign 22, in the pistons 17.

A flushing oil connection 26 in the cylindrical housing part of the machine housing 1 is connected, for the purpose of additional lubricating oil supply of the tapered roller bearings 5, 6, via an annular channel arrangement 27 with the radial bores 25 and with the side of the tapered roller bearing 6 away from the drive disk 7.

The part of the housing inner chamber which is not occupied by the drive mechanism 3, 4, 7 serves as leakage oil chamber 28 for receiving the leakage oil occurring during operation of the axial piston machine. The leakage oil chamber 28 is connected, via the leakage oil connection 8 and a continuing leakage oil line (not shown), with the tank (likewise not shown). At the highest point in the installed disposition the machine housing 1 has a ventilation connection (not shown), which leads via a ventilation line (likewise not shown) to a ventilation valve (not shown).

The pump device 29 shown in FIGS. 1 and 2 is in the form of a impeller 29 with curved vanes 36, which is mounted on the circumference of the drive disk 7 and has a radially extending attachment flange 30 via which it is attached by means of screws 31 to the free end face of the drive disk 7. On both sides of the impeller 29 respective radially running limiting means are attached to the machine housing 1. One of the limiting means is formed by the outer ring 10 and the tapered rollers of the tapered roller bearing 5 neighbouring the drive disk 7 and the other limiting means is formed by an annular plate 32 which is arranged in the region between the cylinder barrel 4 and the drive disk 7 and terminates with a spacing from the imaginary cylindrical surface enveloping the totality of the piston rods projecting out of the cylinder barrel 4. The annular gap corresponding to this spacing is indicated by reference sign 33.

Both limiting means 10, 11 and 32, and the section 34 of the machine housing 1 located between them, form a pump housing for the impeller 29 within the leakage oil chamber 28.

Between the section 34 of the machine housing 1 and the impeller 29 there is an annular chamber 35 which, due to the inclined development of the machine housing section 34 relative to the longitudinal axis L of the axial piston machine—or to the drive mechanism 3, 4, 7—is formed sickle shaped in radial section and into which—in its annular chamber region of largest radial dimension—the leakage oil connection 8 opens (see FIG. 2). The leakage oil flow to the impeller 29 occurs in axial direction, on the one hand via the tapered roller bearing 5 substantially over its entire circumference and on the other hand via the annular gap 33. In the lower vertex region a housing opening 38, closed by a closure screw 37, is formed diametrically opposite to the leakage oil connection 8 in the machine housing 1.

Figure 3:
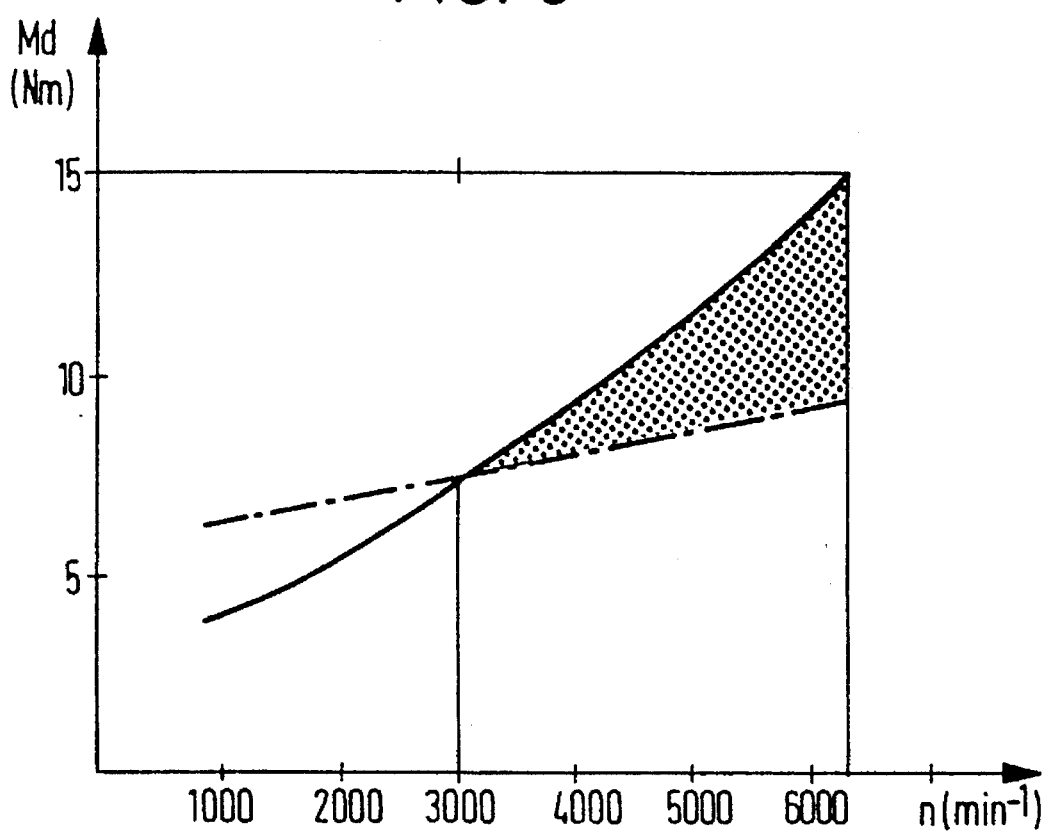
FIG. 3 shows a diagram which illustrates the loss torque of the hydrostatic machine shown in FIGS. 1 and 2 occurring in operation, in dependence upon the speed of rotation of the machine.

Since the functioning of the illustrated hydrostatic machine is known to the skilled person, and a description thereof is therefore unnecessary, there is described below only the functioning of the pump device 29 according to FIGS. 1 and 2. As soon as the hydrostatic machine is driven and the drive mechanism 3, 4, 7 revolves, losses occur which increase with increasing speed of rotation and which include a so-called splash loss component which is brought about by the rotation of the drive mechanism in the leakage oil found in the leakage oil chamber 28 and is represented in FIG. 3 by the solid line. FIG. 3 further shows, with the broken line, the dependence of the remaining, primarily mechanical loss component, which would occur with rotation of the drive mechanism in a leakage oil chamber 28 free of leakage oil. It can be seen that in the region of lower speeds of rotation, up to 3000 min$^{-1}$ (about half of the maximum permitted rate of rotation of 6300 min$^{-1}$) the splash loss component is smaller, and in the region of higher speeds of rotation, above 3000 min$^{-1}$, is larger than the remaining loss component.

During the rotation of the drive mechanism 3, 4, 7, leakage oil leaves the internal oil circulation of the hydrostatic machine and enters the leakage oil chamber 28 mainly via the ball joints 18 and via the bearing formed by the bearing surfaces of the cylinder barrel 4 and the control body 12, and flows from the leakage oil chamber via the annular plate 33 axially towards the impeller 29. The oil, likewise from the internal oil circulation and, if applicable, supplied from the flushing oil connection 26 to the tapered roller bearings 5, 6 also flows axially towards the impeller 29 via the tapered roller bearing 5. The total in flowing oil is directed radially outwardly within the impeller 29, which functions as a centrifugal pump, and is accelerated correspondingly to the rotation of the impeller 29. The kinetic energy thus given to the oil is transformed into pressure in the annular chamber 35, in particular in its region of greatest radial dimension. As soon as the pressure is sufficiently high to overcome the frictional losses in the leakage oil line leading to the tank and the pressure head to the tank, if the tank is arranged at a level above the hydrostatic machine, the leakage oil is pumped out via the leakage oil connection 8.

The impeller 29 and the annular chamber 35 are so configured that the pumping out of the leakage oil begins at a speed of rotation of the drive mechanism, and thus of the impeller 29, of n=3000 min$^{-1}$ and that the feed performance of the impeller 29 is, in the range of speed of rotation above this 3000 min$^{-1}$ greater than the quantity of leakage oil entering the leakage oil chamber per unit of time and, if applicable, the quantity of lubricating oil additionally supplied via the flushing oil connection 26.

Because of this feed performance of the impeller 29 and the horizontal installation of the hydrostatic machine, the leakage oil flowing in via the annular gap 33 is sucked in to the lower vertex region of the annular chamber 35, i.e. in to its region of smallest radial dimension, by the impeller 29, and pumped off as described above. As soon as the level of leakage oil has fallen below the ring plate 32 in its region of smallest radial dimension, only the oil emerging from the tapered roller bearing 5 is pumped off, whilst at the same time leakage oil subsequently flowing into the leakage oil chamber allows the leakage oil level to rise. As soon as this level reaches the annular gap 33 in its lower vertex region, leakage oil is again sucked in by the impeller 29 and pumped off. As a result, a leakage oil level indicated by the reference sign N is established in the lower vertex region of the annular gap 33 below the drive mechanism 3, 4, 7. In this way, the whole splash loss component—shown in FIG. 3 by the shaded region between the full line and the broken line, to the right of the intersection of these two lines—is avoided. This is so for the entire range of speeds of rotation above 3000 min$^{-1}$, since with increasing speed of rotation the feed performance of the impeller 29 increases to the same degree as the quantity of leakage oil arising, including if applicable the quantity of lubricating oil supplied via the flushing oil connection 26.

Figure 5:
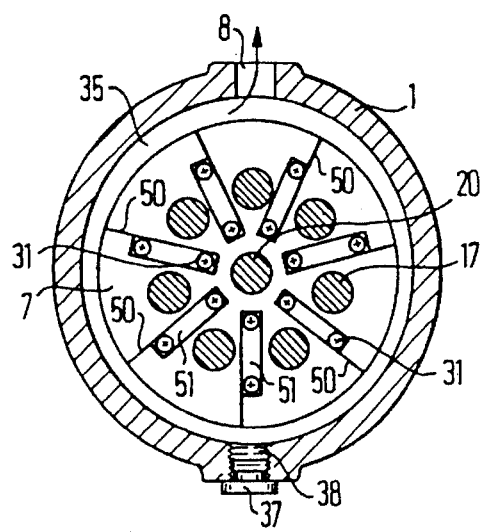
FIG. 5 shows a section along the line V—V of FIG. 4.
Figure 6:
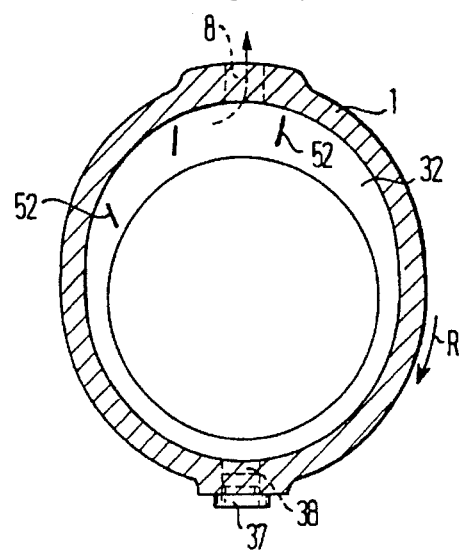
FIG. 6 shows a section along the line VI—VI of FIG. 4.

The pump device 50 shown in FIGS. 4 to 6 is working as a centrifugal pump with radially running vanes 50 which can either be assembled into an impeller or, as shown here, can each be formed in one piece with a perpendicularly projecting mounting plate 51 and attached by this to the free end face of the drive disk 7 facing the cylinder barrel 4 by means of mounting screws 31. This pump device 50, which has the same function as the pump device according to FIGS. 1 and 2, has associated with it a guide vane arrangement having (in this exemplary embodiment) three fixed guide vanes 52 which are secured in the annular plate 32 in the region of the leakage oil connection 8 (see FIG. 6). Two of these guide vanes 52 are arranged before the leakage oil connection 8—in the direction of rotation R of the drive mechanism 3, 4, 7—with a development which is oblique in the direction of rotation R, whilst the remaining guide vane is located immediately after the leakage oil connection 8 and has a radial development. The guide vane arrangement 52 has substantially the same function of pressure transformation as the region of greatest radial dimension of the sickle shaped annular chamber 35 according to FIGS. 1 and 2 and can consequently be arranged also in an annular chamber of constant annular width, as shown in FIGS. 5 and 6, instead of in such a sickle shaped annular chamber 35. In practice, the guide vanes 52 and the vanes 36, 50 are adapted, with regard to their number, size, configuration and development, to the varying operational conditions, for the purpose of optimizing their function.

Figure 7:
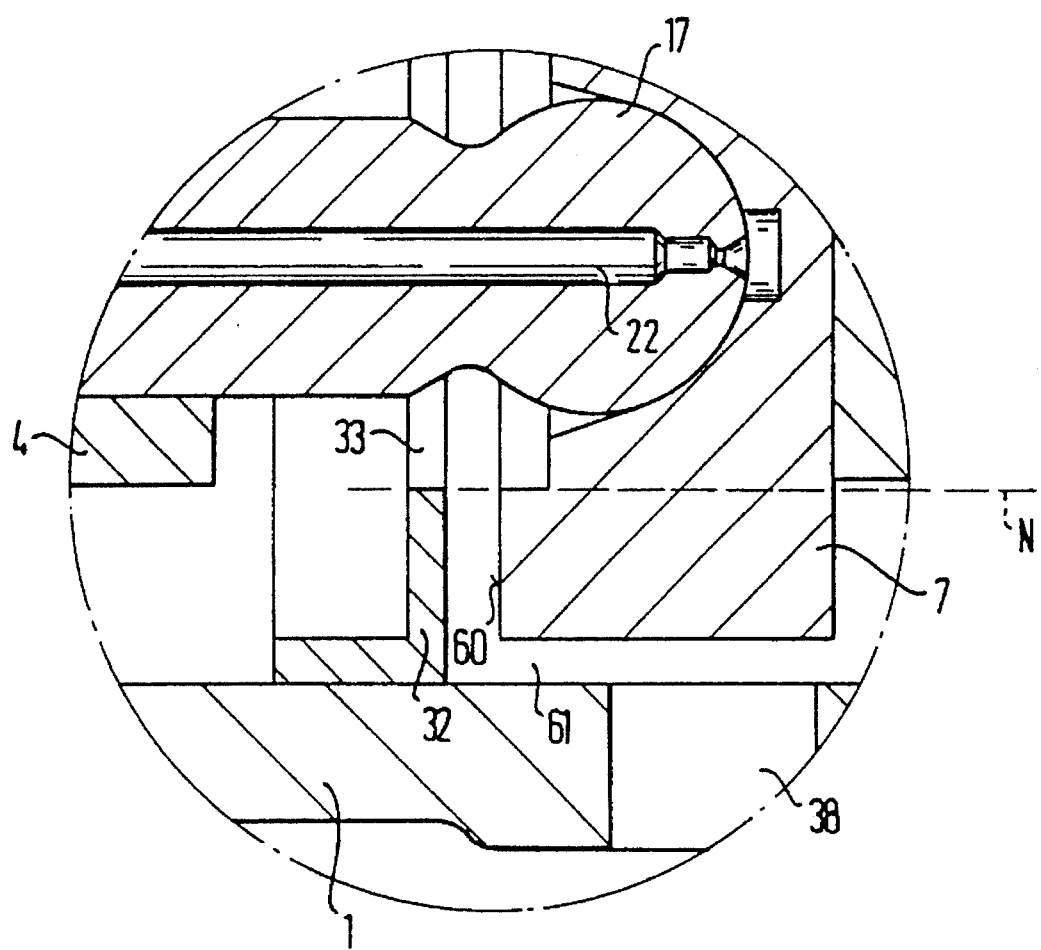
FIG. 7 shows a part of the hydrostatic machine according to a third preferred exemplary embodiment of the invention, in axial section and schematically.

The axial piston machine shown in part in FIG. 7 differs from that of FIG. 1, with otherwise the same construction and function, by a pump device 60 formed as a friction pump, an annular chamber 61 of constant annular width—provided by appropriate adaptation of the machine housing 1—and a leakage oil connection, namely the housing opening 38, formed in the lower vertex region of the machine housing 1, axially spaced from the free end face of the drive disk 7 in the region covered by the drive disk. The friction pump comprises a pump surface 60 in the form of an annular surface section of the free end face of the drive disk 7, in the radial edge region of the disk. The pumping action of this friction pump is based on the carrying along of the frictional layer of the leakage oil to be pumped away which adheres to its pump surface 60, which oil is—with appropriate speed of rotation of the drive mechanism 3, 4, 7—accelerated radially outwardly and is pumped off to the outside via the annular chamber 61 and via the leakage oil connection 38 (or any other housing opening). In order to achieve the pressure transformation, the (radial) annular width of the annular chamber 61 is greater than the thickness of the frictional layer. Of course, a guide vane arrangement can also be employed and/or the annular chamber 35 and the leakage oil connection 8 according to FIG. 1 can be used. In order to increase the adherence of the frictional layer, the pump surface 60 is textured, for example roughened. Its spacing from the annular plate 32 is greater than the thickness of the frictional layer.

Figure 9:
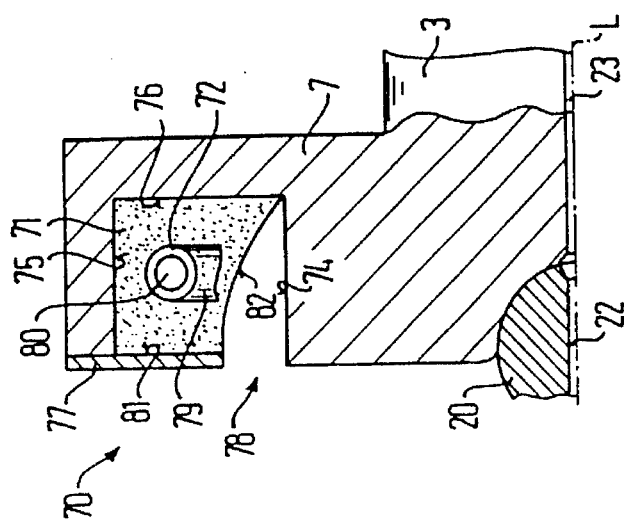
FIG. 9 shows an end view of the pump device according to FIG. 8.
Figure 8:
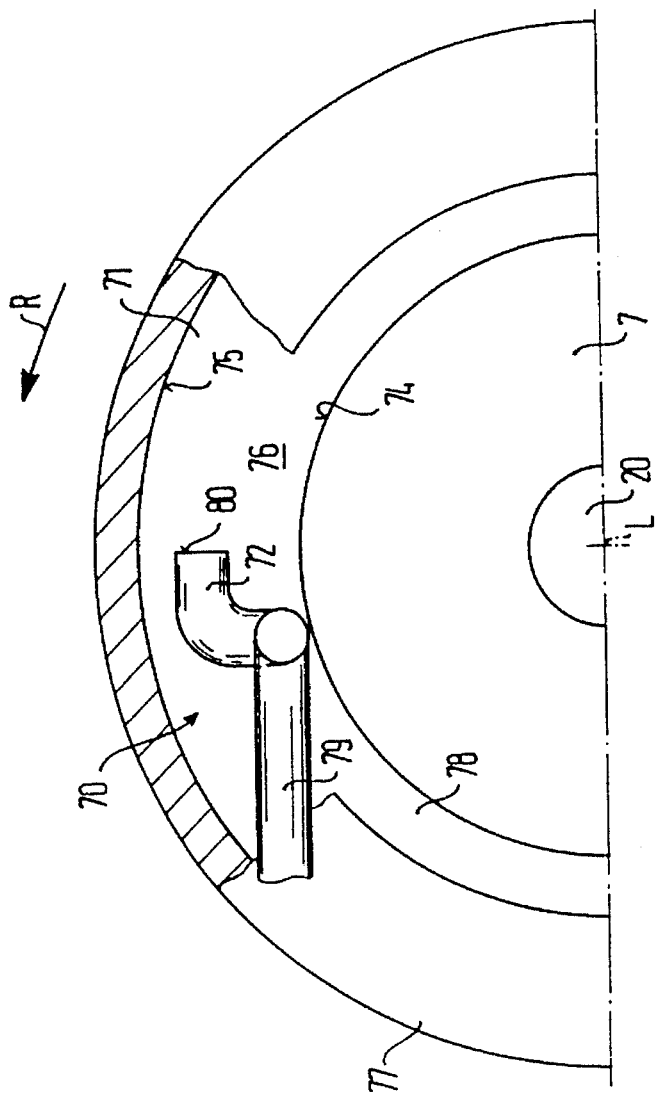
FIG. 8 shows a radial section of a pump device of the hydrostatic machine in accordance with a fourth preferred embodiment of the invention, in a schematic partial representation.

The pump device 70 shown in FIGS. 8 and 9 is incorporated into the drive disk 7 of an axial piston machine which differs from that of FIG. 1 by the omission of the annular plate 32. The pump 70 is likewise a friction pump and comprises an annular groove 71, concentric with the longitudinal axis L, and a pipe piece 72. The annular groove 71 is formed in the radial edge region of the drive disk 7, opening at its free end face and is defined by two cylindrical groove walls 74, 75, concentric with the longitudinal axis L, and a groove floor 76 extending perpendicularly of the longitudinal axis L. An annular groove closure element 77, in the form of an annular closure plate, is attached to the free end face of the drive disk 7 and extends from the periphery of the drive disk so far radially inwardly that it partially closes the opening of the annular groove 71, whereby an annular entry slit 78 to the annular groove 71 remains. The pipe piece 72 is arranged, with tangential development, in the upper vertex region of the machine housing in the internal space region of the annular groove 71 covered by the annular groove closure element 77 and provides the leakage oil connection which is connected to the leakage oil line via a line arrangement 79 leading to the outside of the annular groove 71 and a suitable opening in the machine housing. The pipe piece 72 is open at its end facing oppositely to the direction of rotation R of the drive mechanism 3, 4, 7.

The groove floor 76, the radially outer groove wall 75 and the surface 81 facing the inner space of the annular groove 71 in the region of the annular groove opening are roughened or otherwise textured and provide the effective pump surfaces of the friction pump.

The leakage oil flowing into the annular groove 71 via the entry slit 78 is, with appropriate rotation of the drive disk 7, urged outwardly under the effect of centrifugal force, carried along by the effective pump surfaces 75, 76, 81 with the generation of a pressure head proportional to the speed of rotation, and pumped off to the outside via the pipe piece 72 and the line arrangement 79. In the annular groove, the leakage oil takes up the volume indicated in FIG. 9 by the area filled with black points. The leakage oil/air boundary surface in the annular groove 71 is shown by the line 82 running from the radially inward edge of the annular groove closure element 77 in an arc shape to the circumferential edge between the cylindrical groove wall 74 and the flat groove floor 76.

Apart from the small outlay in terms of construction, the pump device 70 has the advantage that its pump surfaces 75, 76, 81 do not carry with them and pump off air when leakage oil volume in the annular groove 71 is too small or when the leakage oil chamber is empty. In this way, cavitation and oil foaming are avoided, as could otherwise appear as a consequence of underpressure—upon the pumping off of air—or by the flowing of air into the leakage oil chamber.

What is claimed is:

1. A hydrostatic machine comprising an axial piston pump having a machine housing surrounding an internal housing chamber which accommodates a drive mechanism rotatably mounted by means having at least one bearing and having a leakage oil chamber which opens to a region outside of said machine housing via at least one leakage oil connection, and a pump device (29; 50; 60; 70) arranged in the internal housing chamber and in driving connection with the drive mechanism (3, 4, 7), said pump device is provided to pump leakage oil out of the leakage oil chamber (28) through the leakage oil connection (8; 38; 72) to the outside of said machine housing.

2. The hydrostatic machine according to claim 1, wherein the pump device is a centrifugal pump (29; 50; 60; 70).

3. The hydrostatic machine according to claim 1, wherein the pump device (29) comprises an impeller (29; 50).

4. The hydrostatic machine according to claim 3, wherein the pump device (29) further comprises vanes (36) arranged fixed on an external circumference of the drive mechanism (3, 4, 7).

5. The hydrostatic machine according to claim 3, wherein the pump device (50) further comprises vanes (50) arranged fixed on a free end face of the drive mechanism (3, 4, 7).

6. The hydrostatic machine according to claim 3, wherein the pump device (29; 50) is arranged eccentrically of the machine housing (1) forming an annular chamber (35) which is sickle shaped in radial section, and the leakage oil connection (8) opens into a region of the annular chamber (35) which is greatest in radial dimension.

7. The hydrostatic machine according to claim 3, wherein a guide vane arrangement (52) is associated with the pump device (50).

8. The hydrostatic machine according to claim 1, wherein the leakage oil connection (8; 72) is arranged in an upper vertex region of the machine housing (1).

9. The hydrostatic machine according to claim 1, wherein the pump device is a friction pump (60:70) having at least one pump surface (60; 75, 76, 81) rotating with the drive mechanism (3, 4, 7), said friction pump creating a pump effect which is based on the carrying along of an adhering frictional layer of oil to be pumped away, and the leakage oil connection (38; 72) is formed in a region of the pump surface (60; 75, 76, 81).

10. The hydrostatic machine according to claim 9, wherein the pump surface is a cylindrical pump surface (75) formed on the drive mechanism (3, 4, 7).

11. The hydrostatic machine according to claim 9, wherein the pump surface is a flat pump surface (60; 76, 81) extending in a radial plane perpendicular to the drive mechanism (3, 4, 7).

12. The hydrostatic machine according to claim 11, wherein the flat pump surface (60) is formed on a free end face of the drive mechanism (3, 4, 7).

13. The hydrostatic machine according to claim 12, formed as a bent axis machine with a drive disk, wherein the flat pump surface (60) is formed on a free end face of the drive disk (7).

14. The hydrostatic machine according to claim 13, wherein the leakage oil connection (38) is formed at an axial spacing from the flat pump surface (60) in a region covered by the drive disk (7).

15. The hydrostatic machine according to claim 9, wherein the friction pump (70) comprises an annular groove (71) formed in the drive mechanism (3, 4, 7) and pending at a free end face of the drive mechanism, a radially outer groove wall of said annular groove provides a cylindrical pump surface (75) and a groove floor of said annular groove provides a flat pump surface (76), and the leakage oil connection is formed as a pipe piece (72) having an open end (80) directed opposite to a direction of rotation (R) of the drive mechanism (3, 4, 7) and arranged with a substantially tangential development in the annular groove (71) and connected to a line arrangement (79) leading outside of the annular groove (71) and the hydrostatic machine.

16. The hydrostatic machine according to claim 15, wherein an annular groove closure element (77) restricts the opening of the annular groove (71) to an annular entry slit (78), and an interior surface of said closure element facing an internal space region of the annular groove (71) provides a further flat pump surface (81).

17. The hydrostatic machine according to claim 16, wherein the further flat pump surface (81) adjoins the cylindrical pump surface (75).

18. The hydrostatic machine according to claim 9, wherein each pump surface (60: 75, 76, 81) is roughened.

19. The hydrostatic machine according to claim 18, wherein the pipe piece (72) is arranged in the internal space region of the annular groove (71) covered by the annular groove closure element (77).

20. The hydrostatic machine according to claim 1, wherein two substantially radially developing annular limiting means (10, 11; 32) are arranged on both sides of the pump device (29; 50) to form, together with a section (34) of the machine housing (1) located therebetween, a pump housing (10, 11; 32, 34) having axial leakage oil inflow.

21. The hydrostatic machine according to claim 20, wherein one of said annular limiting means is formed as an annular plate (32) attached to the machine housing (1), which terminates at a predetermined spacing from the drive mechanism (3, 4, 7).

22. The hydrostatic machine according to claim 1, wherein the pump device (29; 50) has a feed performance which ensures the pumping off of the leakage oil down to a level (N) below the drive mechanism (3, 4, 7).

23. The hydrostatic machine according to claim 1, wherein the pump device (29; 50) pumps off the leakage oil to a level (N) below the drive mechanism (3, 4, 7) at a rotational speed which is approximately equal to or greater than one half maximum speed of rotation of the drive mechanism (3, 4, 7).

* * * * *

UNITED STATES PATENT AND TRADEMARK OFFICE
CERTIFICATE OF CORRECTION

PATENT NO. : 5,545,013
DATED : August 13, 1996
INVENTOR(S) : Jochen Beck, et al.

It is certified that error appears in the above-indentified patent and that said Letters Patent is hereby corrected as shown below:

On the Title Page, insert the following:

--[21] PCT Filed:   Apr. 28, 1993

[86] PCT No.:    PCT/EP93/01023--

Signed and Sealed this

Twenty-second Day of July, 1997

Attest:

BRUCE LEHMAN

Attesting Officer

Commissioner of Patents and Trademarks